(12) United States Patent
Ye

(10) Patent No.: US 11,687,456 B1
(45) Date of Patent: Jun. 27, 2023

(54) MEMORY COLORING FOR EXECUTING OPERATIONS IN CONCURRENT PATHS OF A GRAPH REPRESENTING A MODEL

(71) Applicant: Advanced Micro Devices, Inc., Santa Clara, CA (US)

(72) Inventor: Mei Ye, San Jose, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 17/558,393

(22) Filed: Dec. 21, 2021

(51) Int. Cl.
*G06F 12/0806* (2016.01)

(52) U.S. Cl.
CPC .. *G06F 12/0806* (2013.01); *G06F 2212/1016* (2013.01)

(58) Field of Classification Search
CPC ............ G06F 12/0806; G06F 12/1425; G06F 12/0857; G06F 2212/1016
USPC ......................................................... 711/118
See application file for complete search history.

(56) References Cited

U.S. PATENT DOCUMENTS

2020/0234411 A1* 7/2020 Xu .................... G06N 3/044
2020/0311992 A1* 10/2020 Sen ................ H04N 21/44008
2021/0349639 A1* 11/2021 Rangan ............... H03M 7/3088

* cited by examiner

*Primary Examiner* — Hashem Farrokh
(74) *Attorney, Agent, or Firm* — Park, Vaughan, Fleming & Dowler LLP

(57) ABSTRACT

An electronic device that handles memory accesses includes a memory and a processor that supports a plurality of streams. The processor acquires a graph that includes paths of operations in a set of operations for processing instances of data through a model, each path of operations including a separate sequence of operations from the set of operations that is to be executed using a respective stream from among the plurality of streams. The processor then identifies concurrent paths in the graph, the concurrent paths being paths of operations between split points at which two or more paths of operations diverge and merge points at which the two or more paths of operations merge. The processor next executes operations in each of the concurrent paths using a respective stream, the executing including using memory coloring for handling memory accesses in the memory for the operations in each concurrent path.

20 Claims, 5 Drawing Sheets

MEMORY COLORING FOR EXECUTING OPERATIONS IN CONCURRENT PATHS OF A GRAPH REPRESENTING A MODEL

BACKGROUND

Related Art

Some electronic devices perform operations for processing instances of input data through models. For example, an electronic device can perform operations for processing images through a classification neural network (i.e., the model) that generates a result indicating whether (or not) specified image elements (e.g., people, cars, etc.) are likely present in the images. Processing instances of input data through models is typically computationally intense, involving many different computational operations associated with various parts of the models. For example, processing an image (or a sequence of images) through a convolutional neural network to determine if the image includes specified image elements includes performing operations for feature processing elements (e.g., convolution, normalizing, pooling, flattening, etc.) that generate reduced-dimension feature maps based on the image. The feature maps are then processed in classification elements (e.g., a fully connected neural network) to generate a result indicating whether (or not) the specified image elements are likely present in the image. In addition to being computationally intense, processing instances of input data through models often requires a large number of memory accesses in memories in electronic devices, such as the memory accesses needed for storing and reading the computational results for feature processing elements and classification elements of a convolutional neural network.

In efforts to reduce the impact on memories associated with processing instances of input data through models, designers have proposed a number of schemes. One such scheme is memory coloring. For memory coloring, a model is analyzed to determine relationships between producer operations that write data to memory and consumer operations that read/consume the data written to memory by producer operations. Then, when processing instances of input data through the model, the model and/or the memory are configured so that memory locations to which data is written to by producer operations in the model are reallocated so that subsequent producer operations in the model can reuse the memory locations as soon as a last consumer operation in the model has consumed/accessed the data. In other words, data that is no longer needed by consumer operations is allowed to be overwritten, thereby permitting memory locations in which unneeded data is stored to be quickly reused. By enabling the rapid reuse of memory locations, memory coloring can provide significant reductions in the amount of memory that is needed for processing instances of input data through models.

In some electronic devices, processors support streams that can be used for processing instances of input data through models (i.e., have a number of stream processors with circuitry for executing respective streams). In these electronic devices, two or more streams can be used in parallel for processing instances of input data through models. In other words, the operations in a given model can be divided up and processed/executed in parallel in respective streams. Although gains can be made in the speed at which instances of input data are processed through the model using multiple streams, the multi-stream environment can limit the use of memory access improvements such as memory coloring. This is true because the parts of the model that are processed/executed in each stream may access the same memory locations in the memory—thereby possibly corrupting data other stream's data in memory. Memory coloring, with above-described the reuse of memory locations, could lead to conflicting reuse of memory locations and the loss and/or corruption of data. In order to prevent streams from performing conflicting memory accesses of memory locations, streams must be allocated respective portions of the memory (e.g., K GiB portions, where K=2, 4, or another number). Unfortunately, the per-stream allocation of memory results in large chunks of memory being reserved for the use of streams, which limits the available memory for other streams (and/or other operations).

BRIEF DESCRIPTION OF THE FIGURES

Throughout the figures and the description, like reference numerals refer to the same figure elements.

DETAILED DESCRIPTION

Figure 1:
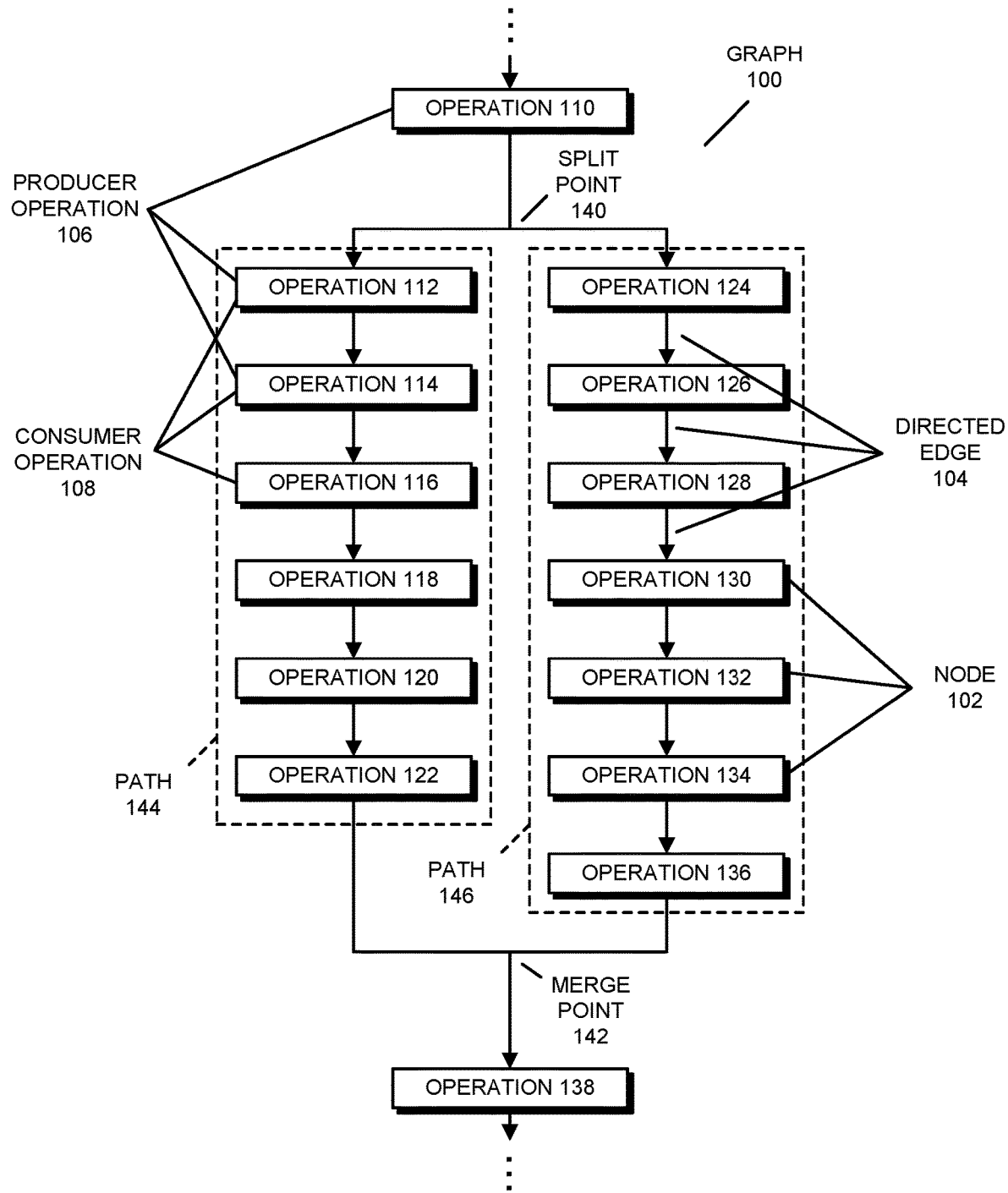
FIG. 1 presents a block diagram illustrating a graph representing operations for a model in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Data: data is a generic term that indicates information that can be stored in memories (e.g., a main memory, a cache memory, etc.) and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

Substantially in parallel: as used herein, substantially in parallel means that two or more operations are performed at approximately the same time—and may be performed at exactly the same time. In some cases, some or all of the two or more operations start at different times and/or end at different times, but at least some portion of operations from among the two or more operations is performed at the same time as other operations from among the two or more operations. For example, operations from two or more concurrent paths of a graph representing operations of a model can be executed substantially in parallel by two or more respective streams—and therefore some or all of the operations in the two or more concurrent paths (or parts thereof) are executed at the same time by the respective stream.

Model

In the described embodiments, instances of input data are processed through models to generate corresponding results. Generally, a model is or includes an arrangement of operations that can be performed on instances of input data to generate a result. One example of a model is a fully connected neural network. Some fully connected neural networks, i.e., discriminative neural networks, include internal elements for inference/classification operations for determining whether instances of input data have specified characteristics (e.g., whether images include particular image elements, whether sound snippets include particular sounds, etc.). Other fully connected neural networks, i.e., generative neural networks, include internal elements for generating output/results that have specified characteristics. Fully connected neural networks include, in their internal elements, a set of nodes organized in a number of layers, the nodes including input nodes, intermediate (or "hidden") nodes, and output nodes. Within the fully connected neural network, each node other than the output nodes is connected to one or more downstream nodes via a directed edge that has an associated weight. During operation, the input nodes, which are in a first layer of the fully connected neural network, receive inputs representing an instance of input data and process the inputs to produce input values. The input nodes forward the input values to the intermediate nodes in the next layer of the fully connected neural network. The receiving intermediate nodes weight the received inputs based on a weight of a corresponding directed edge, i.e., adjust the received inputs such as multiplying by a weighting value, etc. Each intermediate node then sums the corresponding weighted received inputs and possibly a bias value to generate an internal value and evaluates an activation function (e.g., the rectified linear unit or RELU activation function, etc.) for that intermediate node using the internal value to produce a result value. The intermediate nodes then forward the result values as input values to intermediate nodes in the next layer of the fully connected neural network, where the input values are used to generate internal values and evaluate an activation function for those intermediate nodes. In this way, values progress through the intermediate nodes in the layers of the fully connected neural network until a last layer of the intermediate nodes forward result values to the output nodes. The output nodes then generate outputs for the fully connected neural network. Continuing the example of the discriminative fully connected neural network, the outputs produced by the output nodes—and thus from the fully connected neural network—can be in a form, e.g., a number between 0-1, that indicates whether or not instances of input data have the specified characteristics.

Another example of a model is a convolutional neural network. As with the fully connected neural network, the convolutional neural network can be discriminative, and thus can be used to determine whether instances of input data have specified characteristics, or generative, and thus can be used for generating outputs/results having specified characteristics. The internal elements of a discriminative convolutional neural network can be grouped into feature processing elements and classification elements. The feature processing elements process features in instances of input data (e.g., images, audio recordings, etc.) in preparation for the classification of the features in the classification elements. The feature processing elements include internal elements for convolution, normalizing, pooling, and flattening. In the convolution internal elements, a set of filters are used to generate feature maps from instances of input data. The feature maps are then normalized (e.g., using rectified linear units) in the normalizing internal elements. After being processed in the normalizing internal elements, the feature maps are further processed (e.g., subsampled, downsampled, etc.) in the pooling internal elements to generate reduced-dimension feature maps. Flattening internal elements next prepare the reduced-dimension feature maps from the pooling internal elements for input into the classification elements. The classification elements include a fully connected neural network (similar to the fully-connected neural network described above) that classifies inputs (i.e., flattened reduced-dimension feature maps) as including specified elements (or not) and produces outputs representing the classification.

Although a fully connected neural network and convolutional neural network are used as examples of models, in some embodiments, other models are used. Generally, any model having a set of operations that can be organized into a graph having paths as described herein can be used in the described embodiments.

Graph

In the described embodiments, graphs are used as representations of relationships for operations of models. Graphs include internal elements that identify how the operations of models can be executed in a processor. Generally, a graph is a data structure including nodes that represent operations of the model and directed edges between nodes that represent a direction of flow or progress of execution of the operations between the nodes. The edges also represent the flow of data in the model, with producer operations/nodes that produce data (e.g., results from operations, model parameter updates, etc.) being linked by directed edges to consumer operations that consume the data. In some embodiments, graphs are generated based on model information that characterizes or otherwise identifies the internal arrangements of models. For example, assuming that the model is a convolutional neural network, a graph can be generated from model information that characterizes the feature processing elements and classification elements of the convolutional neural network (e.g., configuration files, model files, etc. that identify these elements).

A graph is generated by analyzing the operations of a model to find paths for progressing from operation to operation through the model for processing an instance of input data through the model. In some embodiments, the analysis is based at least in part on data flow between operations of the model, with the flow of data from producer operations to consumer operations used for identifying the paths in a graph. In some embodiments, graphs are optimizations of models, in that graphs are generated with model operations organized in ways intended to improve the performance of a processor (e.g., execution speed, computational load, memory usage, etc.) when executing the operations of the model (in comparison to executing the operations of the model as initially organized in the model). In some embodiments, operations of a model are organized in a graph based on properties of a processor that will execute the operations. For example, a graph may be generated identifying how operations of a model are to be executed using two or more available streams in a multi-stream processor.

FIG. 1 presents a block diagram illustrating a graph representing operations for a model in accordance with some embodiments. Graph 100 includes a number of nodes 102 that are connected via directed edges 104 (only three of the nodes 102 and directed edges 104 are labeled for clarity). Each node 102 represents an operation that is performed when processing an instance of input data through the model represented by graph 100. For example, assuming that the model is a convolutional neural network, the operations include operations such as addition/summing operations for generating internal values for nodes of the convolutional neural network, activation function (e.g., rectified linear unit, etc.) calculations, convolution computations, pooling computations, etc. Each directed edge 104 represents a unidirectional flow of execution of operations from a given operation/node 102 of graph 100 to a next operation/node 102 of graph 100. Directed edges 104 also represent a flow of data from producer operations 106 to consumer operations 108 (only a few producer and consumer operations are labeled for clarity). Producer operations 106 produce data used by one or more subsequent consumer operations 108. Some of the operations, e.g., operations 112, 114, etc., have the properties of both producer operations and consumer operations, in that these operations consume data from a prior producer operation and produce data to be consumed by subsequent consumer operations.

As can be seen in FIG. 1, graph 100 includes split point 140 and merge point 142. Split point 140 is a point at which graph 100 splits into two separate paths, paths 144 and 146. The graph splits to represent the fact that operations 112-122 and operations 124-136 from the model can be executed separately. For example, paths 144 and 146 can be executed using two separate streams in a multi-stream processor. In other words, after operation 110, which is a producer operation, the model includes operations 112 and 124, which are separate consumer operations that consume data produced by operation 110. Path 144 then extends from operation 112 to operation 122, with data produced by some or all of operations 112-120 being consumed by subsequent operations in path 144. Path 146 extends from operation 124 to operation 136, with data produced by some or all of operations 124-134 being consumed by subsequent operations in path 146. Merge point 142 is a point at which graph merges from two separate paths, i.e., paths 144 and 146, into a single path. The graph merges to represent the fact that, operation 138 (and possibly subsequent operations), is/are to be executed sequentially. For example, operation 138 (and possibly subsequent operations) can be executed using a single stream in a multi-stream processor. In other words, following operations 122 and 136, which are producer operations, the model includes operation 138, which is a consumer operation that consumes data produced by both of operations 122 and 136.

Within graph 100, there are no directed edges between operations in path 144 and operations in path 146. There are therefore no flows of execution of operations between operations in paths 144 and 146. In addition, there are no producer operations in path 144 that produce data that is consumed by a consumer operation in path 146 or vice versa. Despite this, it may be true that operations in either path 144 or 146 access memory locations that are accessed by operations in other paths. Continuing the convolutional neural network example, some or all of the operations in path 144 and 146 may be the same convolutional neural network operations, although the operations are performed for a different part of an instance of input data, etc. In this case, because the operations may originally have appeared separately (and possibly in sequential order) in the model, the operations may access the same locations in memory (i.e., perform memory addresses directed to the same virtual addresses, etc.). This would not be a problem in the model itself given the separateness of the operations, but when the operations are executed as shown in graph 100, the operations can access, and thereby corrupt, each other's data in memory. In some embodiments, therefore, each of paths 144 and 146 is executed using a separate portion of memory. For example, in some embodiments, each of paths 144 and 146 are executed using a different stream in a multi-stream processor and each stream is assigned a reserved portion of memory (e.g., an N GiB portion of memory, where N=2, 4, or another number) that is reserved for accesses by that stream.

As can be seen in FIG. 1, graph 100 is non-cyclic. In other words, none of the paths in the model, e.g., paths 144 and 146, include operations that form a loop—and there are no directed edges that feed backwards in graph 100. For example, in some embodiments, graph 100 is a directed acyclic graph (DAG).

Overview

In the described embodiments, an electronic device includes a processor having a number of streams (i.e., stream processors) and a memory. The processor performs operations for processing instances of input data through a model to generate results from the model. For example, in some embodiments, the model is a convolutional neural network that performs inference/classification operations for determining whether instances of input data include specified elements and the processor performs convolutional neural network operations for generating results that indicate whether instances of input data include specified elements (e.g., whether a person appears in images in a video, etc.). For processing instances of input data through the model, the processor identifies concurrent paths in a graph representing the model, the graph including paths of operations to be used for executing the operations of the model. The processor then uses memory coloring for handling memory accesses for operations in some or all of the concurrent paths when processing instances of input data through the model. For memory coloring, memory locations to which data is written to by producer operations are reallocated so that subsequent producer operations can reuse/overwrite the data in the memory locations as soon as all consumer operations that are to consume the data have consumed the data. In other words, for a given concurrent path, the processor determines memory locations that can be quickly reused and then reuses the memory locations where possible, which can help to improve the use of memory.

For using a graph for handling memory accesses as described above, a processor first acquires the graph, the graph including paths of operations from a set of operations for processing instances of data through a model. For example, the processor can generate the graph based on a definition of the model (and possibly other information such as a number of streams available in the processor, etc.) or can receive the graph from another source (e.g., read the graph from a file). Within the graph, the paths each include a separate sequence of operations from the set of operations that are to be executed using a respective stream from among a plurality of streams in the processor. For example, the paths may include paths arranged similarly to paths 144 and 146 in FIG. 1. The processor then identifies concurrent paths in the graph. The concurrent paths are paths of operations between split points at which two or more paths of operations diverge and merge points at which the two or more paths of operations merge, such as split point 140 and merge point 142 in FIG. 1. The processor then executes operations in each of the concurrent paths using a respective stream. For executing each concurrent path in the respective stream, the processor/stream uses memory coloring for separately handling memory accesses for the operations in that concurrent path. Note that, in some embodiments, memory coloring is used on a per-stream basis, meaning that the memory coloring for the memory accesses for each stream effects only that stream.

In some embodiments, for identifying the concurrent paths in graphs as described above, the processor first finds a given split point in the graph (e.g., split point 140) where two or more paths of operations diverge. The processor then traces each of the two or more separate paths of operations (e.g., paths 144 and 146) from the given split point to a subsequent merge point (e.g., merge point 142) where the two or more paths of operations merge. For the tracing, the processor follows the operations in each path, checking dependencies of the operations to ensure that consumer operations in that path do not consume data from producer operations in other paths. The processor does this to ensure the paths are concurrent (i.e., are safe to execute substantially in parallel or "concurrently") and therefore memory coloring can be used for operations in the path without corrupting data in memory for operations in another path. Upon reaching a merge point for each path without encountering dependencies on operations in other paths, the processor identifies each of the paths as a concurrent path. As described above, concurrent paths are deemed safe for using memory coloring.

By using the graph to determine how operations in a model are to be executed by streams in a multi-stream processor, the described embodiments can improve the amount of parallel execution (i.e., the operations from the model that are executed substantially in parallel with other independent operations from the model). By identifying concurrent paths in the graph and using memory coloring for handling memory accesses for operations in concurrent paths, the described embodiments can execute operations in concurrent paths with significantly reduced memory usage (i.e., while using less overall memory locations for storing data for the operations in concurrent paths). Using less memory enables the described embodiments to keep memory available for other operations and therefore improves the overall performance of the memory. Improved performance of the memory leads to improved performance of the electronic device, which increases user satisfaction with the electronic device.

Electronic Device

Figure 2:
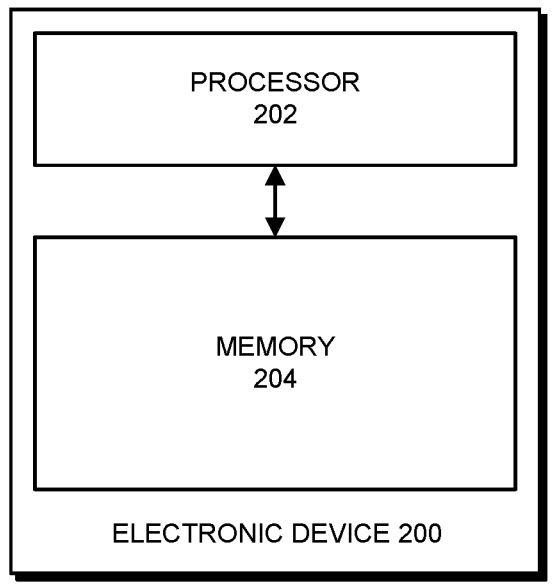
FIG. 2 presents a block diagram illustrating an electronic device in accordance with some embodiments.

FIG. 2 presents a block diagram illustrating an electronic device 200 in accordance with some embodiments. As can be seen in FIG. 2, electronic device 200 includes processor 202 and memory 204. Generally, processor 202 and memory 204 are implemented in hardware, i.e., using corresponding integrated circuitry, discrete circuitry, and/or devices. For example, in some embodiments, processor 202 and memory 204 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some embodiments, processor 202 and/or memory 204 perform operations for or associated with using memory coloring for handling memory accesses for operations in concurrent paths of a graph representing operations of a model as described herein.

Processor 202 is a functional block that performs computational, memory access, control, and/or other operations. For example, processor 202 can be a central processing unit (CPU), a graphics processing unit (GPU), an accelerated processing unit, a system on a chip, a field programmable gate array (FPGA), etc.

Memory 204 is a functional block that stores data for processor 202 (and possibly other functional blocks in electronic device 200 (not shown)). For example, in some embodiments, memory 204 is a higher capacity integrated circuit memory (e.g., a "main" memory, etc.) into which copies of data (e.g., 4 kB pages of data) retrieved from a storage device (not shown) are stored for accesses by processor 202. Memory 204 includes memory circuitry such as fourth generation double data rate synchronous dynamic random-access memory (DDR4 SDRAM) and/or other types of memory circuits, as well as control circuits for handling accesses of the data stored in the memory circuits.

Although electronic device 200 is shown in FIG. 2 with a particular number and arrangement of elements, in some embodiments, electronic device 200 includes different numbers and/or arrangements of elements. For example, in some embodiments, electronic device 200 includes a different number of processors 202. Electronic device 200 is also simplified for illustrative purposes. In some embodiments, however, electronic device 200 includes additional and/or different elements. For example, electronic device 200 can include human interface subsystems (e.g., displays, speakers, keyboards, etc.), electrical power subsystems, input-output (I/O) subsystems, etc. Generally, in the described embodiments, electronic device 200 includes sufficient numbers and/or arrangements of elements to perform the operations herein described.

Electronic device 200 can be, or can be included in, any device that performs the operations described herein. For example, electronic device 200 can be, or can be included in, a desktop computer, a laptop computer, a wearable electronic device, a tablet computer, virtual or augmented reality equipment, a smart phone, an artificial intelligence (AI) or machine learning device, a server, a network appliance, a toy, a piece of audio-visual equipment, a home appliance, a vehicle, etc., and/or combinations thereof. In some embodiments, electronic device 200 is included on one or more semiconductor chips. For example, in some embodiments, electronic device 200 is entirely included in a single "system on a chip" (SOC) semiconductor chip, is included on one or more ASICs, etc.

Processor

Figure 3:
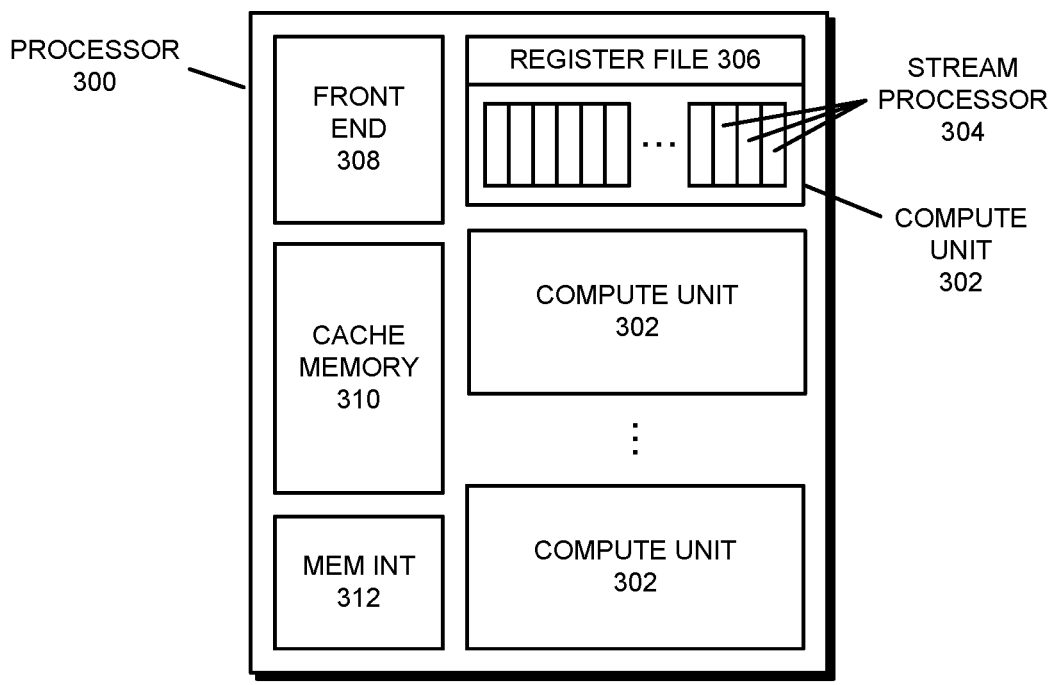
FIG. 3 presents a block diagram illustrating a processor in accordance with some embodiments.

In the described embodiments, an electronic device includes a processor that performs operations for or associated with using memory coloring for handling memory accesses for operations in concurrent paths of a graph representing operations of a model as described herein. FIG. 3 presents a block diagram illustrating a processor 300 in accordance with some embodiments. In FIG. 3, processor 300 is shown as including some of the same elements as might be found in a GPU. Although a particular arrangement and number of elements is shown in processor 300, however, in some embodiments, a different number and/or arrangement of processing subsystem is used in processor 300. For example, in some embodiments, the elements in processor 300 are similar to those that might be found in a CPU. As another example, in some embodiments, the elements in processor 300 include a combination of functional blocks similar to those that might be found in both a CPU and a general purpose GPU (such as with a system on a chip, etc.).

As can be seen in FIG. 3, processor 300 includes a number of compute units 302, each of which (as shown only in the topmost compute unit 302) includes a number of stream processors 304 and a register file 306 (only three of the stream processors 304 are labeled for clarity). Each stream processor 304 is a functional block including processing circuitry (e.g., floating point or integer arithmetic logic units, logic circuitry, etc.) to be used for performing processing operations for one or more processing streams (or, more simply, "streams"). Register file 306 is a functional block that includes memory circuitry for storing information and data for the stream processors 304. In some embodiments, register file 306 includes separate copies of memory circuitry for storing information and data for each of the individual streams. Front end 308 is a functional block that performs operations for scheduling execution in the stream processors 304, receiving and decoding/interpreting commands, requests, messages, etc. from other entities in the electronic device, communication with other entities in the electronic device, etc. Cache memory 310 is a functional block that includes memory circuits for storing local copies of data for compute units 302 (e.g., copies of data acquired from a memory (e.g., memory 204) and/or another source). Memory interface (MEM INT) 312 is a functional block that includes circuitry for accessing (e.g., reading, writing, invalidating, etc.) data in cache memory 312.

Memory

Figure 4:
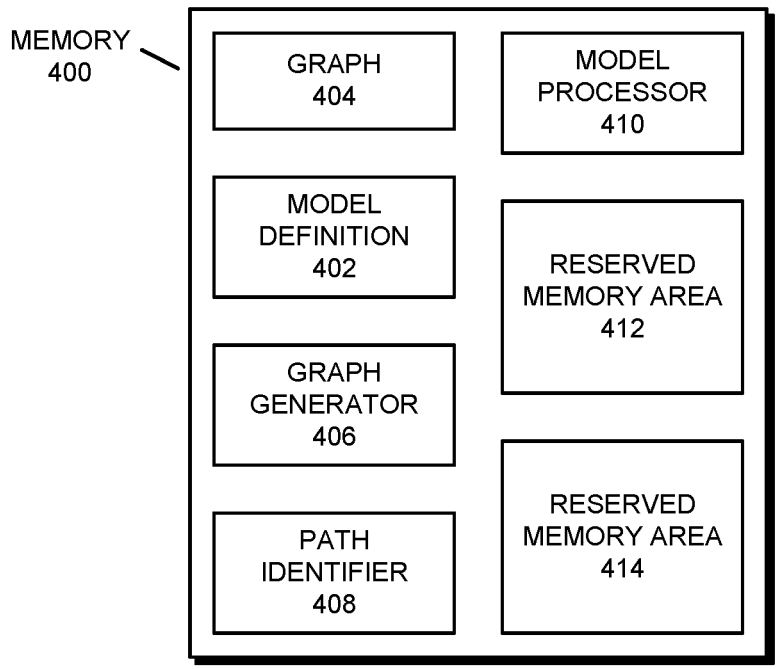
FIG. 4 presents a block diagram illustrating data stored in a memory in accordance with some embodiments.

In the described embodiments, a memory stores data to be used for performing operations for or associated with using memory coloring for handling memory accesses for operations in concurrent paths of a graph representing operations of a model as described herein. FIG. 4 presents a block diagram illustrating data stored in a memory 400 in accordance with some embodiments. In some embodiments, memory 204 stores data similar to memory 400 (and possibly other data). As can be seen in FIG. 4, memory 400 stores model definition files (MODEL DEFINITION) 402.

Model definition file 402 are or include one or more files having information that defines a model through which instances of input data are to be processed. For example, in some embodiments, the model is a fully connected neural network and model definition file 402 includes one or more files with neural network configuration information, weight values, bias values, and/or other values that define and characterize the fully connected neural network.

Graph files (GRAPH) 404 are or include one or more files with information defining a graph (e.g., graph 100). The graph is a data structure including nodes that represent operations of the model defined in model definition files 402 and directed edges between nodes that represent a direction of flow or progress of execution of the operations between the nodes. Graph files 404 is read by a processor (e.g., processor 202) for determining an order of operations to be performed when processing instances of input data through the model. For example, in some embodiments, graph files 404 include information that identifies paths (e.g., paths 144-146) of operations to be executed by one or more streams (e.g., stream processors 304) in the processor. In these embodiments, the processor reads the graph files 404 and performs operations in the paths of operations as identified in graph files 404 for processing instances of input data through the model. In some embodiments, a processor (e.g., processor 202) generates the graph—and thus the corresponding graph files 404—based on information about the model acquired from model definition files 402, possibly in combination with other information (e.g., a number of streams available for processing instances of input data through the model, etc.). In these embodiments, therefore, the processor analyzes model definition files 402 to determine the flow of operations when processing instances of input data through the model, and then uses the flow of operations for defining the nodes and directed edges of the graph. In some of these embodiments, as part of generating the graph, the processor optimizes the graph, and thus the flow of operations therein, based on one or more performance goals. For example, in some embodiments, the performance goal is maximizing parallel execution of operations of the model when processing instances of input data through the model and the processor preferentially generates a graph with a larger number (or a given number) of parallel paths.

Graph generator 406 includes program code for a graph generator software application that, when executed by a processor, causes the processor to generate a graph based on a model as described above. In other words, graph generator 406 causes the processor to analyze model definition files 402 and generate graph files 404.

Path identifier 408 includes program code for a path identifier software application that, when executed by a processor, causes the processor to identify concurrent paths in graph files 404 for which memory coloring can be used for memory accesses. In other words, path identifier 408 causes the processor to analyze paths in the graph in graph files 404 to find concurrent paths in the graph, the concurrent paths being paths of operations between split points at which two or more paths of operations diverge and merge points at which the two or more paths of operations merge. Path identifier 408 then configures model processor 410 (or another entity, such as one or more streams) so that memory coloring is used for memory accesses for operations in the concurrent paths. For example, path identifier 408 can generate information (e.g., one or more files, signals, etc.) that identify concurrent paths for model processor 410 that model processor 410 (or the other entity) uses for configuring streams to use memory coloring for operations in concurrent paths. In other words, path identifier 408 provides concurrent path information that is used by model processor 410 (or the other entity) for identifying concurrent paths for which memory coloring can be used when performing operations in the paths when processing instances of input data through the model.

Model processor 410 includes program code for a model execution software application that, when executed by a processor, causes the processor to perform operations for processing instances of input data through a model. Model processor 410 reads graph files 404 and performs operations for processing instances of input data through the model in an order and arrangement identified in graph files 404. In addition, model processor 410 uses information output from path identifier 408 for configuring streams to use memory coloring for operations in concurrent paths.

Reserved memory areas 412-414 are memory areas that are reserved for the use of particular streams (i.e., stream processors 304) when executing operations along paths in graph files 404 for processing instances of input data through a model. Recall that it is possible that operations in paths may perform memory accesses that conflict with similar operations (or other operations) in other paths. In order to shield streams executing operations in each of two or more paths from conflicting memory accesses, in some embodiments, each stream is assigned a separate reserved memory area to be used for memory accesses for that stream—and other streams are not permitted to perform memory accesses in other stream's reserved memory areas. For the example in FIG. 4, there are two streams, each of which is allocated a reserved memory area, with a first stream being allocated reserved memory area 412 and a second stream being allocated reserved memory area 414.

Although a number of examples of data are shown in FIG. 4 as being stored in memory 400, FIG. 4 is general example of data stored in a memory 400 in some embodiments. In other embodiments, however, different data is stored in memory. For example, in some embodiments, graph generator 406, path identifier 408, and model processor 410 are included in a single/unified software application—i.e., are functions within the software application. In addition, memory 400 may store other data (and possibly a large amount of other data) that is not shown in FIG. 4 for clarity (i.e., may store data for other software applications, etc.). Generally, in the described embodiments, memory 400 stores sufficient data to enable the operations described herein.

Memory Coloring

Figure 5:
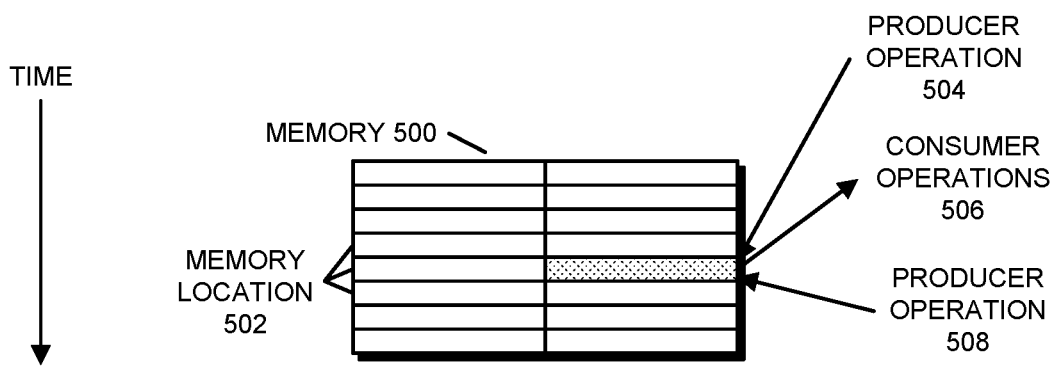
FIG. 5 presents a block diagram illustrating operations for memory coloring in accordance with some embodiments.

In the described embodiments, memory coloring is used for handling memory accesses by streams when performing operations for processing instances of input data through a model. More specifically, memory coloring is used for handling memory accesses by streams when executing operations along concurrent paths in a graph of operations. FIG. 5 presents a block diagram illustrating operations for memory coloring in accordance with some embodiments. For the example in FIG. 5, with regard to the occurrence in time of producer operation 504, consumer operations 506, and producer operation 508, time proceeds downward, as shown by the time arrow on the left side of FIG. 5. Producer operation 504 therefore occurs first, with the other operations following at later times.

As can be seen in FIG. 5, memory 500 includes a number of memory locations 502 (only a few of which are labeled for clarity). Memory locations 502 are addressable portions of memory such as N byte chunks of memory into which data can be stored by streams (i.e., by model processing software executed by the streams) when performing operations for processing instances of input data through a model (N=64, 125, or another number). For example, assuming that the model is a convolutional neural network, the data stored in memory locations 502 can be data such as sums from addition/summing operations for generating internal values for nodes of the convolutional neural network, results from activation function (e.g., rectified linear unit, etc.) calculations, etc.

With regard to memory coloring, memory coloring involves a producer operation 504 storing data to a memory location 502 (shown as shaded in FIG. 5). For example, producer operation 504 can store (via a corresponding stream) data output from an operation on a concurrent path in a graph such as described herein. One or more consumer operations 506 read the data in the memory location 502. After the last consumer operation that is to read the data reads the data from the memory location 502, the memory location 502 is freed/reallocated so that subsequent producer operations can reuse/overwrite the data in the memory location 502. In other words, the memory location 502 is freed—and is not used to keep the now unneeded data from producer operation 504—as soon as consumer operations 506 that are to consume the data have consumed the data. In some embodiments, the last consumer operation 506 that is to use the data is known via metadata or other information associated with the last consumer operation (e.g., in a model definition file 402 or metadata associated therewith, as generated by performing on-the-fly memory use analysis, etc.). In some embodiments, the last consumer operation 506 that is to use the data immediately follows producer operation 504—and thus producer operations and consumer operations are found in consecutive pairs of operations. After the memory location 502 is freed, a subsequent producer operation 508 stores data in the memory location 502.

Although an example is presented for FIG. 5 in which data generated while processing instances of input data through a model is stored in memory locations 502, in some embodiments, memory 500 is not limited to storing this particular data. In some embodiments, therefore, other data can be stored in memory locations 502. For example, if the memory locations 502 are generally accessible, any entity that is permitted to store data in memory 500 can store data in memory locations 502. If the memory locations are in a reserved memory area (e.g., reserved memory area 412, etc.), the other data that can be stored in the memory locations may be limited to data that is produced by a corresponding stream. Generally, in the described embodiments, memory coloring can be used for reusing memory locations as described herein.

Process for Using Memory Coloring for Handling Memory Accesses

Figure 6:
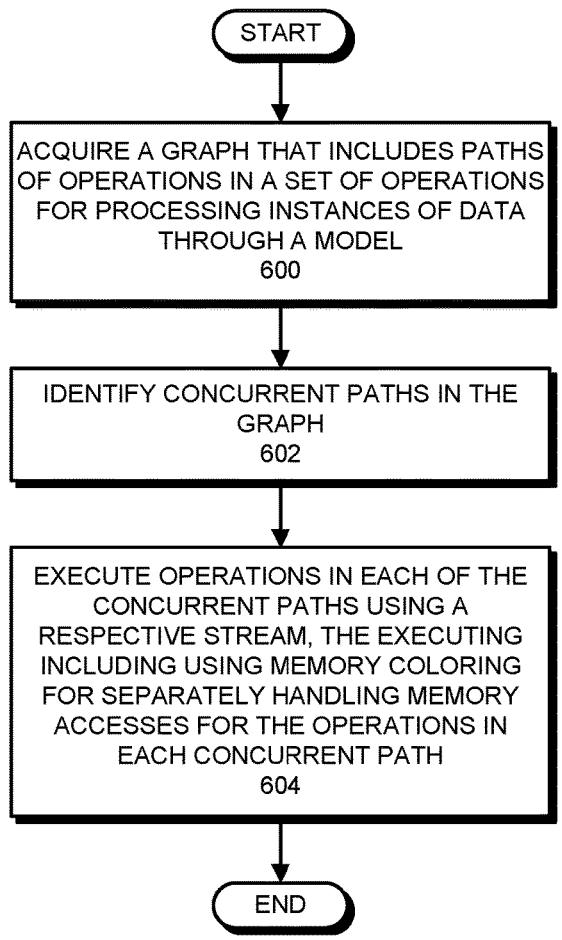
FIG. 6 presents a flowchart illustrating a process for using memory coloring for handling memory accesses for operations in concurrent paths of a graph in accordance with some embodiments.
Figure 7:
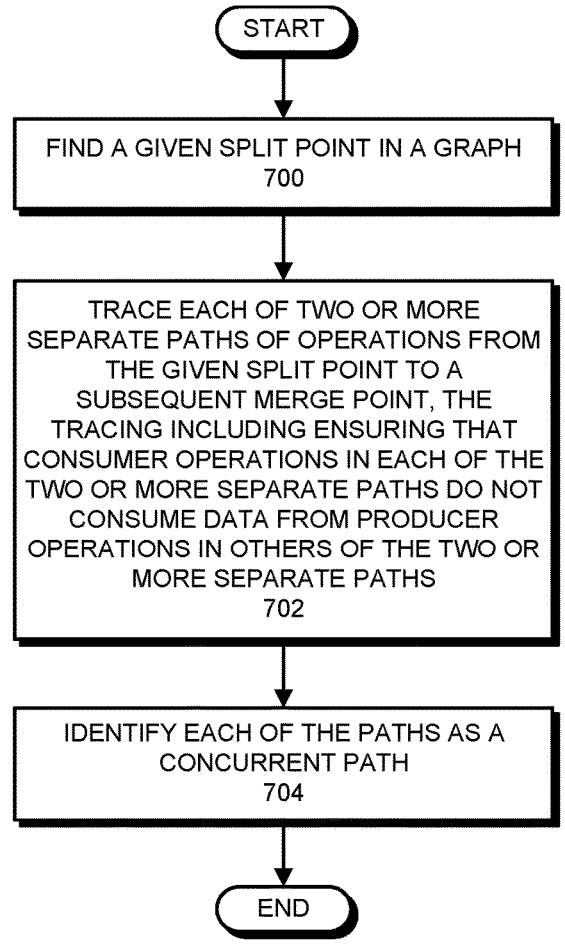
FIG. 7 presents a flowchart illustrating a process for identifying concurrent paths in accordance with some embodiments.
Figure 8:
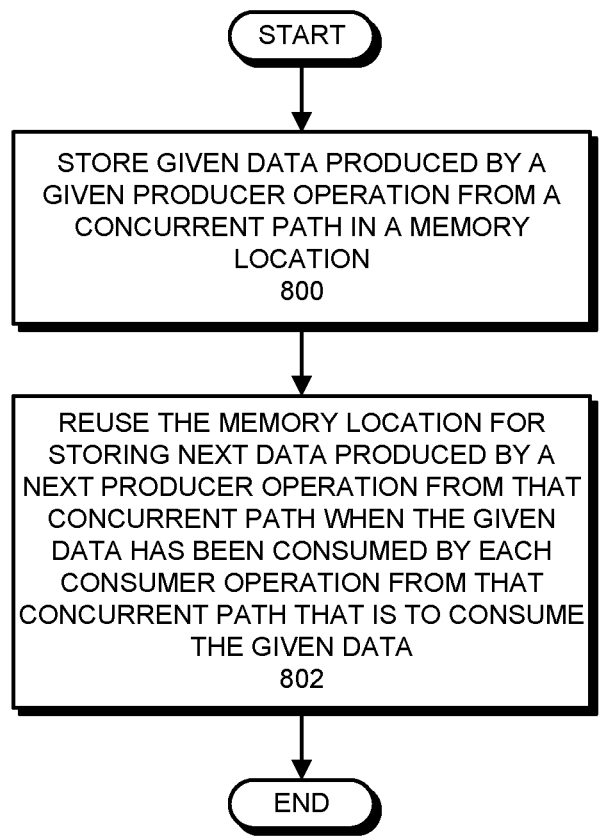
FIG. 8 presents a flowchart illustrating a process for using memory coloring for handling memory accesses in accordance with some embodiments.

In the described embodiments, a processor uses memory coloring for handling memory accesses for operations in concurrent paths of a graph of operations for processing instances of input data through the model. FIG. 6 presents a flowchart illustrating a process for using memory coloring for handling memory accesses for operations in concurrent paths of a graph in accordance with some embodiments. FIG. 7 presents a flowchart illustrating a process for identifying concurrent paths in accordance with some embodiments. FIG. 8 presents a flowchart illustrating a process for using memory coloring for handling memory accesses in accordance with some embodiments. FIGS. 6-8 are presented as general examples of operations performed in some embodiments. In other embodiments, however, different operations are performed and/or operations are performed in a different order. Additionally, although certain elements are used in describing the processes (e.g., a processor, a path identifier software application, etc.), in some embodiments, other elements perform the operations.

As can be seen in FIG. 6, the process starts when a processor acquires a graph that includes paths of operations in a set of operations for processing instances of data through a neural network (step 600). For this operation, a graph generation software application executed by the processor (e.g., graph generator 406) and/or another entity generates a graph (e.g., graph files 404) based on/from a model (e.g., model definition files 402) that includes paths of operations from a set of operations for processing instances of data through a model. The processor (e.g., path identifier 408 executing on the processor) acquires the graph, such as by receiving the graph from the graph generation software application and/or the other entity or retrieving the graph from memory (e.g., from memory 400).

The processor then identifies concurrent paths in the graph (step 602). For this operation, the processor (e.g., path identifier software 408 executing on the processor) analyzes paths in the graph to find paths of operations between split points at which two or more paths of operations diverge and merge points at which the two or more paths of operations merge. As can be seen in FIG. 7, this operation involves finding a given split point in the graph (step 700). In other words, finding a point in the graph where two or more separate paths of operations diverge (e.g., split point 140). From the given split point, each of the two or more separate paths of operations are traced to a subsequent merge point where the two or more paths of operations merge (step 702). For the tracing, the processor ensures that consumer operations in each of the two or more separate paths do not consume data from producer operations in others of the two or more separate paths. If data is consumed by operations in one or more of the paths in this way, then the paths have a dependency on one another and are not considered concurrent paths. This is true because, in some embodiments, "concurrent" paths can be separately executed substantially in parallel with one another. When there are no dependencies between the two or more paths, upon reaching the subsequent merge point, the processor identifies each of the paths as a concurrent path (step 704). For step 602, the processor repeatedly performs the operation of FIG. 7 until a specified number of concurrent paths in the graph are identified (e.g., until all concurrent paths in the graph are identified). In some embodiments, the processor ignores or discards concurrent paths having specified properties, such as concurrent paths that are too short (i.e., include less than a threshold number of operations, etc.), include specified operations, access particular memory locations, etc.

Returning to FIG. 6, after identifying the concurrent paths in the graph, the processor executes operations in each of the concurrent paths using a respective stream, the executing including using memory coloring for handling memory accesses for the operations in each concurrent path (step 604). For this operation, the processor executes the operations in each of the concurrent paths using a different stream (e.g., stream processor 304). For example, if the model is a convolutional neural network and thus the operations in each of the concurrent paths are convolutional neural network operations, each stream executes convolutional neural network operations from the respective concurrent path. When executing the operations, each stream writes data (e.g., results of operations, etc.) to a memory. For example, each stream can write data to a reserved memory area (e.g., reserved memory area 412, etc.) that is allocated to that stream. The processor (e.g., model processor 410 executing on the processor) uses memory coloring for reusing memory locations to which data is written by the streams for producer operations. Generally, by reusing memory locations, the amount of memory needed for executing operations in each of the concurrent paths is reduced—so that less memory/fewer memory locations can be used for memory accesses while executing the operations in the concurrent paths. As can be seen in FIG. 8, for memory coloring, the processor stores given data produced by a given producer operation (e.g., producer operation 504) from a concurrent path in locations in a memory (step 800). For this operation, the processor, while and/or as a result of executing the producer operation, generates the given data to be stored in memory. The processor then stores the given data in a memory location (e.g., memory location 502) in the memory. The processor then reuses the location in the memory for storing next data produced by a next producer operation from that concurrent path when the given data has been consumed by each consumer operation from that concurrent path that is to consume the given data (step 802). For this operation, the processor, using memory coloring information (e.g., metadata associated with consumer operations and/or the memory location, etc.) or otherwise, determines that the last consumer operation from that concurrent path that is to consume the given data has consumed the data. For example, if there is one consumer operation that is to consume the given data (e.g., a next operation following the given producer operation), the processor can monitor for the completion of that consumer operation. The processor then subsequently reuses the memory location (i.e., overwrites the data in the memory location) for a next producer operation in the concurrent path.

Multi-Processor Execution of Operations in Concurrent Paths

For the examples in the description above, a single multi-stream processor executes operations in each of two or more concurrent paths using respective streams. For executing each concurrent path in the respective stream, the single multi-stream processor uses memory coloring for separately handling memory accesses for the operations in that concurrent path, so that memory coloring is used on a per-stream basis. In some embodiments, however, two or more processors (e.g., GPU cores, CPU cores, etc.) are used for executing operations in concurrent paths substantially in parallel. In other words, the described embodiments are not limited to using a single multi-stream processor for executing operations in concurrent paths, but can use two or more processors. In these embodiments, the two or more processors can share a memory, so that the processors can all access data in the memory. When executing operations in concurrent paths, each of the processors use uses memory coloring for separately handling memory accesses for the operations in the respective concurrent path. That is, memory coloring can be used at the processor level for executing operations in concurrent paths (as well as at the stream level as described above). In some of these embodiments, some or all of the two or more processors support multiple streams (e.g., include stream processors 304, etc.). In these embodiments, the two or more processors can execute operations in concurrent paths using respective streams, so that a given one of the two or more processors can separately execute operations for two or more concurrent paths using respective streams.

In some embodiments, at least one electronic device (e.g., electronic device 200, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations "in hardware" and without executing instructions.

In some embodiments, a data structure representative of some or all of the functional blocks and circuit elements described herein (e.g., electronic device 200 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling memory accesses in an electronic device that includes a memory and one or more processors, each processor of the one or more processors supporting a plurality of streams, the method comprising:
   acquiring a graph that includes paths of operations in a set of operations for processing instances of data through a model, each path of operations including a separate sequence of operations from the set of operations that is to be executed using a respective stream from among the plurality of streams on the one or more processors;
   identifying concurrent paths in the graph, the concurrent paths being paths of operations between split points at which two or more paths of operations diverge and merge points at which the two or more paths of operations merge; and
   executing operations in each of the concurrent paths using a respective stream from among the plurality of streams on the one or more processors, the executing including using memory coloring for handling memory accesses in the memory for the operations in each concurrent path.

2. The method of claim 1, wherein identifying each concurrent path in the graph includes:
   finding a given split point in the graph from which two or more paths of operations diverge;
   tracing each of the two or more paths of operations from the given split point to a subsequent merge point where the two or more paths of operations merge, the tracing including ensuring that consumer operations in each of the two or more paths of operations do not consume data produced by producer operations from other paths of operations of the two or more paths of operations; and
   identifying each of the two or more paths of operations as a concurrent path.

3. The method of claim 1, wherein:
some or all of the paths of operations have a data producer-consumer relationship in which one or more data producer operations in a path of operations produce data that is consumed by one or more subsequent data consumer operations in the path of operations.

4. The method of claim 1, wherein using memory coloring for handling memory accesses in the memory for the operations in each concurrent path includes:
storing given data produced by a given producer operation from that concurrent path in a memory location in the memory; and
reusing the memory location for storing next data produced by a next producer operation from that concurrent path when the given data has been consumed by each consumer operation from that concurrent path that is to consume the given data.

5. The method of claim 4, further comprising:
allocating a reserved memory area for storing data produced by producer operations in each concurrent path, wherein:
operations in other concurrent paths are not permitted to access data in a reserved memory area for a given concurrent path; and
the memory location is in the reserved memory area for a corresponding concurrent path.

6. The method of claim 1, further comprising:
receiving a definition of the model that identifies the set of operations for processing instances of data through the model; and
generating the graph based at least in part on the definition of the model.

7. The method of claim 1, wherein the model is a neural network.

8. The method of claim 1, wherein executing operations in each of the concurrent paths using a respective stream from among the plurality of streams on the one or more processors includes executing some or all of the operations in each of the concurrent paths using the respective stream substantially in parallel.

9. The method of claim 1, wherein, for each stream from among the plurality of streams on the one or more processors, the respective processor includes processor circuitry configured for executing operations.

10. The method of claim 1, wherein the graph is a directed acyclic graph (DAG) that includes nodes representing operations, the nodes being connected to one another by edges, each edge being a unidirectional path between two nodes representing progress between the nodes and thus the operations, wherein there are no closed loops between nodes in the DAG.

11. A non-transitory computer readable storage medium storing instructions that, when executed by an electronic device that includes a memory and one or more processors, each processor of the one or more processors supporting a plurality of streams, cause the electronic device to perform a method for handling memory accesses, the method comprising:
acquiring a graph that includes paths of operations in a set of operations for processing instances of data through a model, each path of operations including a separate sequence of operations from the set of operations that is to be executed using a respective stream from among the plurality of streams on the one or more processors;
identifying concurrent paths in the graph, the concurrent paths being paths of operations between split points at which two or more paths of operations diverge and merge points at which the two or more paths of operations merge; and
executing operations in each of the concurrent paths using a respective stream from among the plurality of streams on the one or more processors, the executing including using memory coloring for handling memory accesses in the memory for the operations in each concurrent path.

12. The non-transitory computer readable storage medium of claim 11, wherein identifying each concurrent path in the graph includes:
finding a given split point in the graph from which two or more paths of operations diverge;
tracing each of the two or more paths of operations from the given split point to a subsequent merge point where the two or more paths of operations merge, the tracing including ensuring that consumer operations in each of the two or more paths of operations do not consume data produced by producer operations from other paths of operations of the two or more paths of operations; and
identifying each of the two or more paths of operations as a concurrent path.

13. The non-transitory computer readable storage medium of claim 11, wherein:
some or all of the paths of operations have a data producer-consumer relationship in which one or more data producer operations in a path of operations produce data that is consumed by one or more subsequent data consumer operations in the path of operations.

14. The non-transitory computer readable storage medium of claim 11, wherein using memory coloring for handling memory accesses in the memory for the operations in each concurrent path includes:
storing given data produced by a given producer operation from that concurrent path in a memory location in the memory; and
reusing the memory location for storing next data produced by a next producer operation from that concurrent path when the given data has been consumed by each consumer operation from that concurrent path that is to consume the given data.

15. The non-transitory computer readable storage medium of claim 14, wherein the method further comprises:
allocating a reserved memory area for storing data produced by producer operations in each concurrent path, wherein:
operations in other concurrent paths are not permitted to access data in a reserved memory area for a given concurrent path; and
the memory location is in the reserved memory area for a corresponding concurrent path.

16. The non-transitory computer readable storage medium of claim 11, wherein the method further comprises:
receiving a definition of the model that identifies the set of operations for processing instances of data through the model; and
generating the graph based at least in part on the definition of the model.

17. The non-transitory computer readable storage medium of claim 11, wherein the model is a neural network.

18. The non-transitory computer readable storage medium of claim 11, wherein executing operations in each of the concurrent paths using a respective stream from among the plurality of streams on the one or more processors includes executing some or all of the operations in each of the concurrent paths using the respective stream substantially in parallel.

19. The non-transitory computer readable storage medium of claim 11, wherein the graph is a directed acyclic graph (DAG) that includes nodes representing operations, the nodes being connected to one another by edges, each edge being a unidirectional path between two nodes representing progress between the nodes and thus the operations, wherein there are no closed loops between nodes in the DAG.

20. An electronic device that handles memory accesses, comprising:
   a memory; and
   a processor that supports a plurality of streams, the processor configured to:
      acquire a graph that includes paths of operations in a set of operations for processing instances of data through a model, each path of operations including a separate sequence of operations from the set of operations that is to be executed using a respective stream from among the plurality of streams;
      identify concurrent paths in the graph, the concurrent paths being paths of operations between split points at which two or more paths of operations diverge and merge points at which the two or more paths of operations merge; and
      execute operations in each of the concurrent paths using a respective stream, the executing including using memory coloring for handling memory accesses in the memory for the operations in each concurrent path.

* * * * *